United States Patent
Zhu et al.

(10) Patent No.: US 10,691,439 B2
(45) Date of Patent: Jun. 23, 2020

(54) METHOD AND APPARATUS FOR FACILITATING A SOFTWARE UPDATE PROCESS OVER A NETWORK

(71) Applicant: ALIBABA GROUP HOLDING LIMITED, George Town, Grand Cayman (KY)

(72) Inventors: Yunfeng Zhu, Hangzhou (CN); Zhushi Cheng, Hangzhou (CN); Yunfeng Tao, Hangzhou (CN)

(73) Assignee: ALIBABA GROUP HOLDING LIMITED, George Town, Grand Cayman (KY)

( * ) Notice: Subject to any disclaimer, the term of this patent is extended or adjusted under 35 U.S.C. 154(b) by 0 days.

(21) Appl. No.: 15/227,941

(22) Filed: Aug. 3, 2016

(65) Prior Publication Data

US 2017/0039058 A1   Feb. 9, 2017

(30) Foreign Application Priority Data

Aug. 3, 2015   (CN) .......................... 2015 1 0481261

(51) Int. Cl.
  *G06F 8/65* (2018.01)
  *H04L 29/08* (2006.01)
  *G06F 8/656* (2018.01)

(52) U.S. Cl.
  CPC ................ *G06F 8/65* (2013.01); *G06F 8/656* (2018.02); *H04L 67/34* (2013.01)

(58) Field of Classification Search
  CPC ............ G06F 8/65; H04L 67/34; H04L 43/10
  (Continued)

(56) References Cited

U.S. PATENT DOCUMENTS 8,843,622 B1   9/2014 Graham et al.
9,058,251 B1 *  6/2015 Dorwin ............... G06F 11/3003
(Continued)

FOREIGN PATENT DOCUMENTS

RU            2372644 C2 * 11/2009 ............. G06F 8/658
WO    WO 2014/138980 A1    9/2014
WO    WO 2017/024085 A1    2/2017

OTHER PUBLICATIONS

Zhang, "Delivery of Personalized and Adaptive Content to Mobile Devices:A Framework and Enabling Technology", Aug. 2003, University of Maryland, vol. 12, Article 13 (Year: 2003).*
(Continued)

*Primary Examiner* — Wei Y Zhen
*Assistant Examiner* — Junchun Wu
(74) *Attorney, Agent, or Firm* — Finnegan, Henderson, Farabow, Garrett & Dunner LLP (57) ABSTRACT

An apparatus for facilitating an update process of a software program is disclosed. The apparatus comprises a logic processing module arranged to maintain a connection with a network device, receive information for updating a software program from the network device, perform an updating of the software program based on the received information, and process one or more user requests. The apparatus further comprises an interface module arranged to receive a user request, store the received user request when the updating of the software program by the logic processing module is in progress, store the received user request, and after the updating of the software program completes, provide the stored user request to the logic processing module for processing.

15 Claims, 4 Drawing Sheets

(58) Field of Classification Search
USPC .......................................................... 717/173
See application file for complete search history.

(56) References Cited

U.S. PATENT DOCUMENTS

| | | | |
|---|---|---|---|
| 2001/0008024 A1 | 7/2001 | Inaba | |
| 2002/0105924 A1 | 8/2002 | Yang et al. | |
| 2004/0068724 A1 | 4/2004 | Gardner, III et al. | |
| 2004/0123281 A1* | 6/2004 | Olrik | G06F 8/65 717/168 |
| 2007/0083610 A1* | 4/2007 | Treder | H04L 67/34 709/217 |
| 2007/0169087 A1* | 7/2007 | Fadell | H04L 67/1095 717/168 |
| 2007/0169110 A1* | 7/2007 | Gupta | G06F 8/65 717/174 |
| 2008/0244738 A1* | 10/2008 | Shiozawa | G06F 21/6218 726/21 |
| 2009/0222806 A1* | 9/2009 | Faus | G06F 8/63 717/168 |
| 2009/0300179 A1* | 12/2009 | Srinivasan | H04L 63/10 709/225 |
| 2009/0307683 A1* | 12/2009 | Gharabally | G06F 8/65 717/173 |
| 2010/0058306 A1* | 3/2010 | Liles | G06F 21/572 717/168 |
| 2010/0235623 A1* | 9/2010 | Simpson | G06F 21/40 713/155 |
| 2012/0084766 A1* | 4/2012 | Shanmugam | G06F 8/65 717/173 |
| 2013/0332916 A1 | 12/2013 | Chinn | |
| 2016/0173331 A1* | 6/2016 | Janke | H04L 67/2823 709/221 |
| 2016/0191618 A1* | 6/2016 | Shi | H04L 67/1095 707/610 |
| 2017/0116162 A1* | 4/2017 | Williamson | G06F 40/117 |

OTHER PUBLICATIONS

Kumar et al., "Systems Science & Control Engineering: An Open Access Journal", Apr. 2014, Taylor & Francis (Year: 2014).*
Nayak et al., "Resonance: Dynamic Access Control for Enterprise Networks", Aug. 2009, ACM (Year: 2009).*
Díaz-Sánchez et al., "Sharing Conditional Access Modules through the Home Network for Pay TV Access", Jan. 2009, IEEE (Year: 2009).*
PCT International Search Report and Written Opinion dated Oct. 7, 2016, issued in corresponding International Application No. PCT/US2016/045441 (12 pages).
EPO communication enclosing the extend European search report, which includes, pursuant to Rule 62 EPC, the supplementary European search report (Art. 153(7) EPC) and the European search opinion, dated Jul. 16, 2018, issued in application No. 16833845.7-1224 (13 pages).
First Chinese Office Action issued in Chinese Application No. 201510481261.4, dated Nov. 29, 2018 (13 pages).

* cited by examiner

METHOD AND APPARATUS FOR FACILITATING A SOFTWARE UPDATE PROCESS OVER A NETWORK

CROSS-REFERENCE TO RELATED APPLICATION

This application is based on and claims priority to Chinese Patent Application No. 201510481261.4, filed Aug. 3, 2015, the entire contents of which are incorporated herein by reference.

TECHNICAL FIELD

The present disclosure generally relates to the field of computer technology and, more particularly, to a method and an apparatus for facilitating a software update process over a network.

BACKGROUND

In a distributed computation system, a network device (e.g., a server) typically interacts with thousands of client devices. The network device may also provide updates to the software programs installed on client devices. The updates can be for the purposes of performance upgrade, bug fixing, etc.

With current technologies, a typical process of updating a software program includes the client device halting the execution of the software program, and then updating a software development kit (SDK).

There are a number of disadvantages with the conventional processes of updating a software program. First, the user may experience service interruption when the execution of the software program is halted. As a result, the user experience will be severely degraded. Second, it becomes very complicated and difficult to manage a version of the software at the client devices when performing the software update across a large number of client devices.

SUMMARY

One aspect of the present disclosure is directed to an apparatus for facilitating an update process of a software program. The apparatus comprises a logic processing module arranged to maintain a connection with a network device, receive information for updating a software program from the network device, perform an updating of the software program based on the received information, and process one or more user requests. The apparatus further comprises an interface module arranged to receive a user request, store the received user request when the updating of the software program by the logic processing module is in progress, store the received user request, and after the updating of the software program completes, provide the stored user request to the logic processing module for processing.

Another aspect of the present disclosure is directed to an apparatus for facilitating an update process of a software program. The apparatus comprises a connection establishment module arranged to maintain a connection with a client device, and a software update information transmission module arranged to transmit, to the client device, an instruction to perform the updating of the software program. The software update information transmission module is also arranged to receive, from the client device, a request for downloading information for updating the software program, the request including information about a current version of the software program. The software update information transmission module is also arranged to determine the requested information based on the information about the current version, and transmit the requested information to the client device.

Another aspect of the present disclosure is directed to a computer-implemented method for facilitating an update process of a software program. The method comprises: maintaining a connection with a network device; receiving information for updating a software program from the network device; and performing an updating of the software program based on the received information. The method further comprises: when performing the updating of the software program: receiving a user request, and storing the received user requests; after the updating of the software program completes, processing the stored user requests.

Another aspect of the present disclosure is directed to a computer-implemented method for facilitating an update process of a software program. The method comprises: maintaining a connection with a client device; transmitting, to the client device, an instruction to perform the updating of the software program; receiving, from the client device, a request for downloading information for updating the software program, the request including information about a current version of the software program; determining the requested information based on the information about the current version; and transmitting the requested information to the client device.

Another aspect of the present disclosure is directed to a non-transitory computer-readable storage medium that stores a set of instructions that is executable by at least one processor of a device to cause the device to perform any of the methods described above.

Additional objects and advantages of the disclosed embodiments will be set forth in part in the following description, and in part will be apparent from the description, or may be learned by practice of the embodiments. The objects and advantages of the disclosed embodiments may be realized and attained by the elements and combinations set forth in the claims.

It is to be understood that both the foregoing general description and the following detailed description are exemplary and explanatory only and are not restrictive of the disclosed embodiments, as claimed.

DESCRIPTION OF THE EMBODIMENTS

Embodiments of the present disclosure provide a system for facilitating a software update process over a network. The system can be a part of a client device (e.g., a personal computer, a smart phone, a tablet, a wearable (e.g., a smart watch), or any kind of mobile terminals). The system can include a logic processing module configured to process a request to access a network device (e.g., a content server), and to maintain a connection with the network device. The logic processing module is also configured to receive information from a network device (e.g., a software update management server) for performing an update to a software program installed on the client device, and to perform the update after receiving the information. The system can also include an interface module configured to receive requests to access the network device when the update to the software program is in progress, and to store the requests. After the update is completed, the interface module can provide the stored requests to the processing module for processing.

With embodiments of the present disclosure, an interface module is provided to interact with the user and to store the access requests received from the user when the software update is in progress, service interruption can be minimized. As a result, user experience can be improved.

Figure 1:
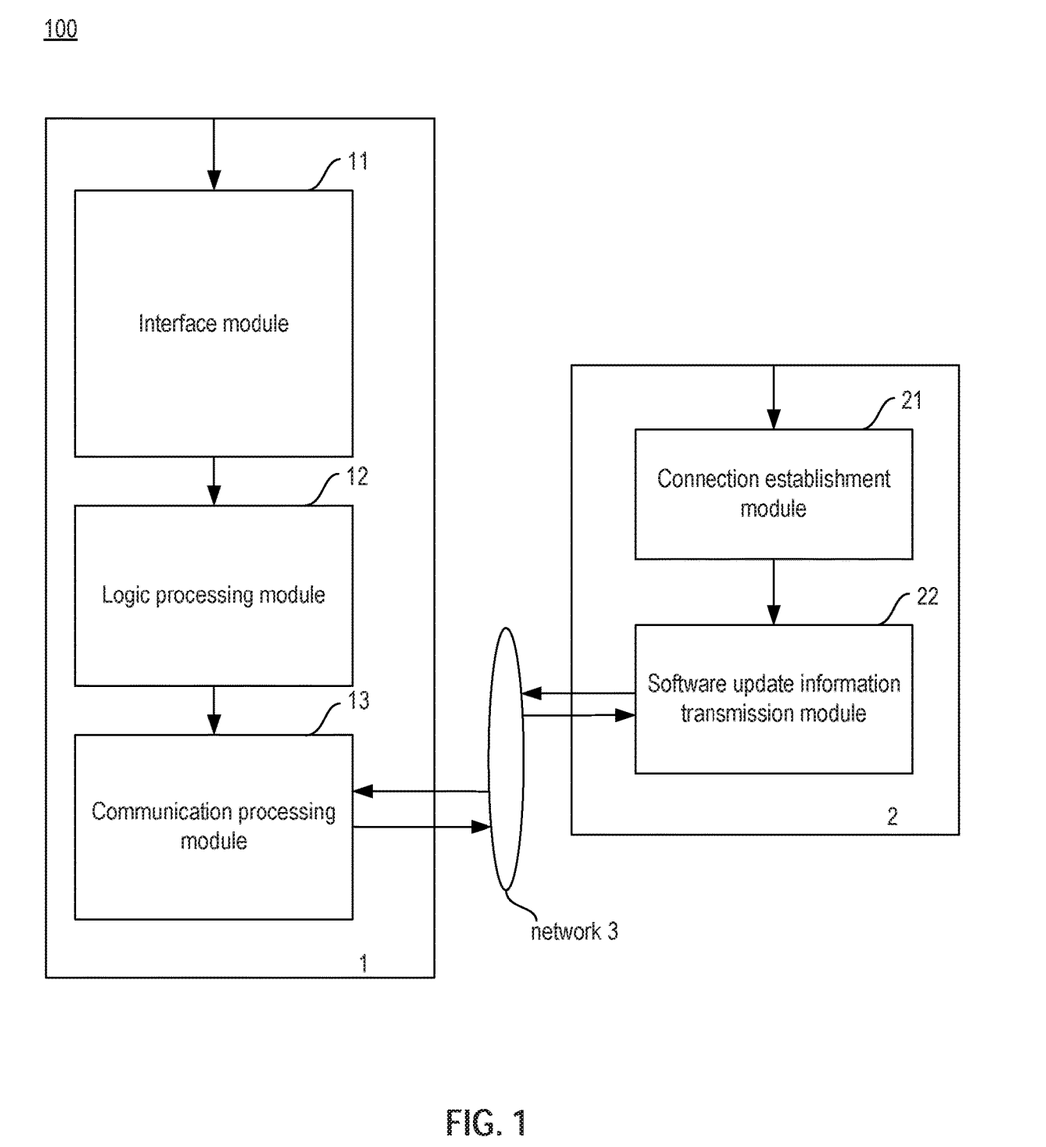
FIG. 1 is a block diagram illustrating an exemplary system for facilitating a software update process over a network, consistent with embodiments of the present disclosure.

Reference is now made to FIG. 1, which illustrates a system 100 for facilitating a software update process over a network, according to embodiments of the present disclosure. As shown in FIG. 1, system 100 includes a client device 1 and a network device 2 communicatively coupled via a network 3. Client device 1 can be any type of mobile terminal, such as a personal computer, a smart phone, a tablet, etc. Client device 1 may include an interface module 11, a logic processing module 12, and a communication processing module 13.

In some embodiments, logic processing module 12 is configured to process a request to access a network device (e.g., a content server, network device 2, etc.). Logic processing module 12 may also maintain a connection with network device 2. Logic processing module 12 may also receive information from network device 2 for performing an update to a software program installed on client device 1, and perform the update after receiving the information.

In some embodiments, interface module 11 is configured to receive requests to access the network device when the update to the software program is in progress, and to store the requests. Interface module 11 may continue receiving and storing the requests after the update process has completed, and provide the stored requests (received during and after the update process) to logic processing module 12 for processing.

In some embodiments, communication processing module 13 is configured to facilitate the connection between logic processing module 12 and network device 2. For example, communication processing module 13 may perform a serialization (or deserialization) of the information transmitted between logic processing module 12 and network device 2.

Although not shown in FIG. 1, it is appreciated that client device 1 may include a memory that stores a set of instructions, and an electronic circuit configured to execute the set of instructions to perform a computation (e.g., to process digital information). The electronic circuit can include but not limited to a microprocessor, an application specific integrated circuit (ASIC), a field programmable gate array (FPGA), a digital signal processor (DSP), or any kind of embedded device.

In some embodiments, the aforementioned modules can be a part of a software program stored in a computer readable medium (e.g., a memory) and be executed by the electronic circuit of client device 1. For example, interface module 11 can be implemented as an application programming interface (API), while logic processing module 12 can be implemented as a packaged software unit. In some embodiments, logic processing module 12 can be implemented using a dynamic programming language, such as Lua, which allows updating of the module (e.g., addition of new codes, extending objects and definition, etc.) at runtime. Lua is a lightweight programming language that provides easy sandboxing, and can be executed and updated efficiently across different platforms.

In some embodiments, interface module 11 can provide an interface for various types of user operations, and convert a request (e.g., to access a network device) received from the user to a format that is supported by logic processing module 12. Interface module 11 may also activate the execution resources of client device 1 for executing logic processing module 12 (e.g., an interpreter, a compiler, a linker, etc.), and provide the necessary files for the execution of the module (e.g., library files, object files, etc., for building an executable file including the source codes of logic processing module 12). Interface module 11 may receive and store requests received from the user when an update to logic processing module 12 is in progress, and provide the received requests (converted to a suitable format) to logic processing module 12 for processing after the update is completed.

Moreover, in some embodiments, logic processing module 12 can also maintain a connection with network device 2. For example, logic processing module 12 can transmit, periodically within a certain time interval, a set of heart beat request packets to network device 2. Logic processing module 12 can then receive, from network device 2, one or more responses to the heart beat request packets, which can indicate that the connection is maintained. Logic processing module 12 may also receive, via the connection, information related to a software update. For example, logic processing module 12 may transmit, via the connection, a request for software update. The request may also include version information of a software program to be updated.

As an illustrative example, logic processing module 12 may receive, from network device 2, an instruction to update a software program. Based on the instruction, logic processing module 12 may transmit a request to network device 2 for downloading information for updating the software program (e.g., codes, library and object files, etc.). The request may include version information of, for example, logic processing module 12. Logic processing module 12 may then receive the requested information from network device 2.

In some embodiments, the version information may also include version information of, for example, interface module 11 and communication processing module 13. The version information of these modules may allow network device 2 to perform other functions, such as conducting a compatibility analysis of client device 1.

In some embodiments, logic processing module 12 may also receive from network device, in addition to the information for updating the software program, verification information. Logic processing module 12 can then perform the updating based on the received information, after determining that the verification information satisfies certain criteria (e.g., whether the verification information indicates that the received information corresponds to a particular version of the software). Based on this determination, logic processing module 12 can then determine whether the received information corresponds to what has been requested for. Such an arrangement can improve the likelihood that logic processing module 12 receives the correct information for the software update.

In some embodiments, communication processing module 13 is configured to facilitate communication between logic processing module 12 and network device 2. For example, communication processing module 13 may receive information to be transmitted to network device 2 from logic processing module 12, perform a serialization processing on the information, and then transmit the processed information to network device 2 via network 3. Moreover, after receiving information targeted at client device 1 from network 3, communication processing module 13 may also perform a deserialization processing on the received information, and then transmit the processed information to logic processing module 12 for processing. In some embodiments, the serialization (and deserialization) processes involve converting the information between a format for storage (e.g., a binary format) and a format for network transmission (a binary format, a string format, etc.).

In an illustrative example, a software update process at client device 1 may include the logic processing module 12 maintaining a connection with network device 2. The maintaining of the connection may include periodic exchange of heart beat messages (e.g., client device 1 may transmit a heart beat request packet, and network device 2 may transmit a heart beat response packet) between logic processing module 12 and network device 2. The heart beat response packet from network device 2 may include an instruction to perform an update to a software program at client device 1. After receiving the instruction, logic processing module 12 may transmit, to network device 2, a request for downloading information for updating the software program (which may also include logic processing module 12). The request may include a current version of the software program installed on client device 1. Network device 2 may then transmit the requested information (e.g., codes, library and object files, etc.) to client device 1.

After client device 1 receives the information for updating the software program, logic processing module 12 can verify that the received information corresponds to the request (e.g., based on verification information). After the received information is verified, in a case where logic processing module 12 is to be updated, logic processing module 12 may stop processing requests from the user, and halt the operation of communication processing module 13. Logic processing module 12 may then instruct interface module 11 to initiate the software update process. Interface module 11 may, for example, activate the computation resources for updating the software program (e.g., an interpreter, a compiler, a linker, etc.), and provide the received information for updating the software program to the computation resources (e.g., library files, object files, etc.). After the updating of the software program completes, logic processing module 12 may resume processing requests from the user and resume the operation of communication processing module 13. Moreover, when the updating is in progress, interface module 11 may also receive the requests from the users and store them, and then provide the stored requests (as well as new requests) to logic processing module 12 for processing after the updating has completed.

Referring back to FIG. 1, network device 2 may also include a connection establishment module 21, and a software update information transmission module 22. Network device 2 can be a computer, a server, or a collection of servers forming a cloud to support cloud computing. Network 3 may include, for example, the Internet, a local area network (LAN), a wireless local area network (WLAN), a virtual private network (VPN), an ad hoc network, etc.

In some embodiments, connection establishment module 21 is configured to maintain connections with one or more client devices (including client device 1). Software update information transmission module 22 is configured to transmit to a client device (e.g., client device 1) an instruction to update a software program, and information for updating the software program.

In some embodiments, software update information transmission module 22 can receive, from client device 1, a request for downloading information for updating the software program, and the request may include information about a current version of the software program installed on client device 1. Software update information transmission module 22 can then determine the information for updating the software program (e.g., codes, library and object files, etc.) based on the current version information, and transmit the information to client device 1.

In some embodiments, software update information transmission module 22 can generate verification information based on, for example, the current version information, transmit the verification information with the information for updating the software program to client device 1. Client device 1 can then use the verification information to verify that it has received the information it requested for.

In some embodiments, connection establishment module 21 can receive heart beat request packets from client device 1, and transmit heart responses back to client device 1, to indicate that a connection is established between client device 1 and network device 2.

In some embodiments, network device 2 further includes a version management module 23 (not pictured), which can manage the software update information for client device 1 (and some other client devices). For example, version management module 23 may store and maintain the software update information that corresponds to different versions of logic processing module 12, which allows network device 2 to transmit the corresponding software update information to client device 1, to affect a predetermined version update of logic processing module 12 at client device 1.

For the purposes of this disclosure, it is appreciated that at least some of these modules (and any corresponding sub-modules) can also be a packaged functional hardware unit designed for use with other components (e.g., portions of an integrated circuit) that performs a particular function of related functions. If the disclosed "modules" are implemented in hardware, they may comprise an embedded system or other dedicated hardware configured by machine code, assembly code, or the like to interact with other modules to perform functions consistent with disclosed embodiments.

Figure 2:
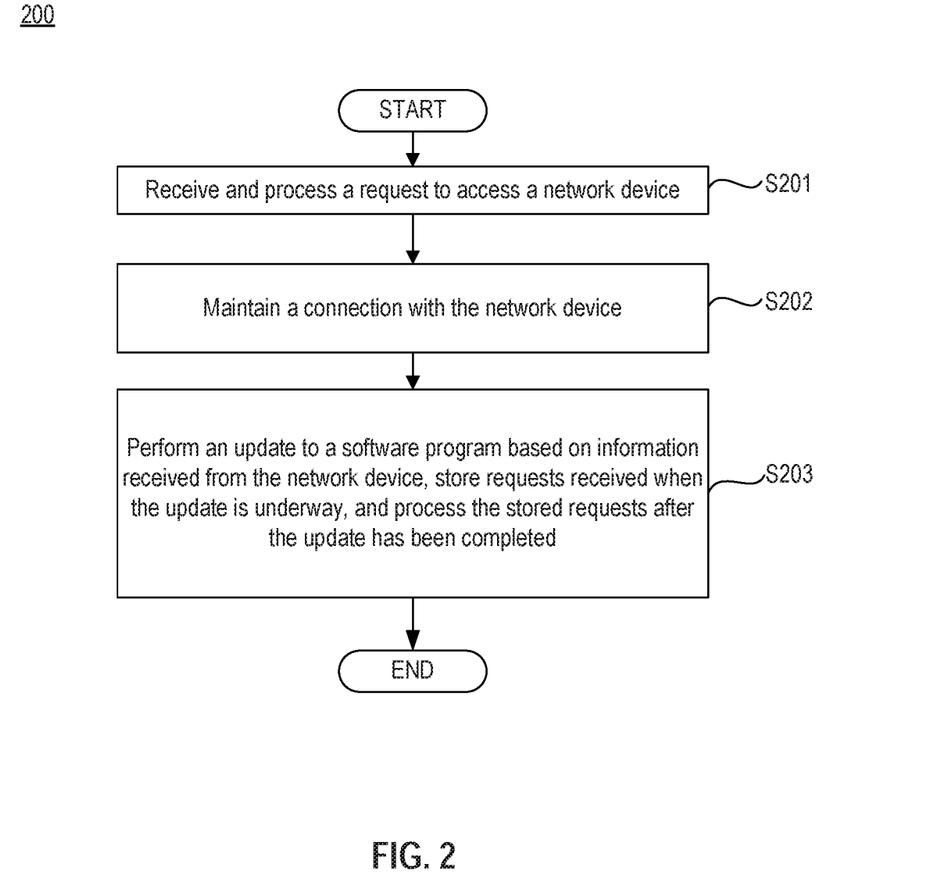
FIG. 2 is a flow chart illustrating an exemplary method for facilitating a software update process over a network, consistent with embodiments of the present disclosure.

Reference is now made to FIG. 2, which illustrates an exemplary method 200 for facilitating a software update process over a network, consistent with embodiments of the present disclosure. In some embodiments, method 200 can be performed by a client device (e.g., client device 1 of FIG. 1). Referring to FIG. 2, method 200 may include the following steps.

In step S201, the client device receives and processes a request to access a network device (e.g., a content server). In some embodiments, step S201 can be performed by, for example, interface module 11 and logic processing module 12 of FIG. 1. For example, interface module 11 can receive and store the access requests when logic processing module 12 is undergoing a software update, and provide the stored requests to logic processing module 12 after the update completes.

In step S202, the client device maintains a connection with the network device. In some embodiments, step S201 can be performed by, for example, logic processing module 12 and/or communication processing module 13. For example, logic processing module 12 can exchange heart beat messages with the network device to maintain the connection. The heart beat messages may include version information and a request for downloading information for updating logic processing module 12. Communication processing module 13 may perform serialization and deserialization operation on the information received from the network (or to be transmitted to the network) to convert between formats for storage and processing and formats for transmission.

In step S203, the client device performs an update to a software program based on information received from the network device. In some embodiments, step S203 can be performed by, for example, interface module 11 and logic processing module 12 of FIG. 1. Step S203 may include, for example, receiving an instruction to update a software program (e.g., logic processing module 12) from the network device, transmitting a request for downloading information for the software update to the network device, and receiving the requested information. The request may include information about a current version of the software program to be updated. The information for the software update may also include verification information, which allows the client device to verify that it has received the requested information. Step S203 may also include, for example, activating the computation resources for the software update (e.g., to active a compiler, an interpreter, a linker, etc.) and providing the information received from the network device for the software update (e.g., codes, library and object files, etc.)

Figure 3:
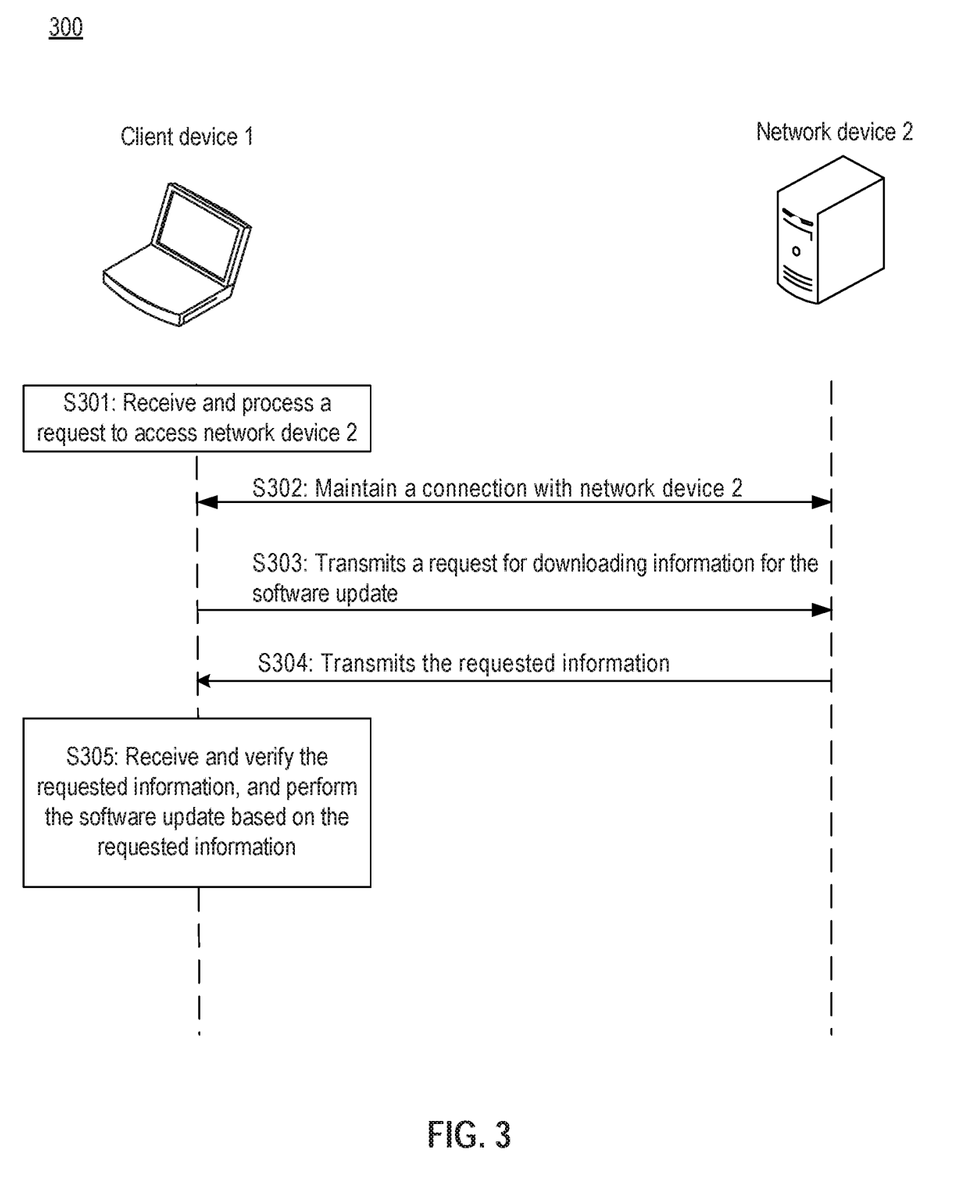
FIG. 3 is a block diagram illustrating an exemplary system for facilitating a software update process over a network, consistent with embodiments of the present disclosure.

Reference is now made to FIG. 3, which illustrates an exemplary method 300 for facilitating a software update process over a network, consistent with embodiments of the present disclosure. In some embodiments, method 300 can be performed between a client device (e.g., client device 1 of FIG. 1) and a network device (e.g., network device 2 of FIG. 1). Referring to FIG. 3, method 300 may include the following steps.

In step S301, client device 1 receives and processes a request to access network device 2.

In step S302, client device 1 maintains a connection with network device 2. Step S302 may include, for example transmitting periodic heart beat request packets to network device 2, and receiving a heart beat response packet from network device 2, to confirm that the connection is maintained.

In step S303, client device 1 transmits a request for downloading information for the software update to network device 2, after receiving a heart beat response packet from network device 2 that includes an instruction to perform software update at client device 1.

In step S304, network device 2 transmits the requested information to client device 1.

In step S305, client device 1 receives the requested information. Client device 1 can then perform the software update process, which may include verifying the received information, activating the computation resources for the software update, and storing requests received from the user when the software update is in progress. Client device 1 can then process the stored requests after the software update process has completed.

Figure 4:
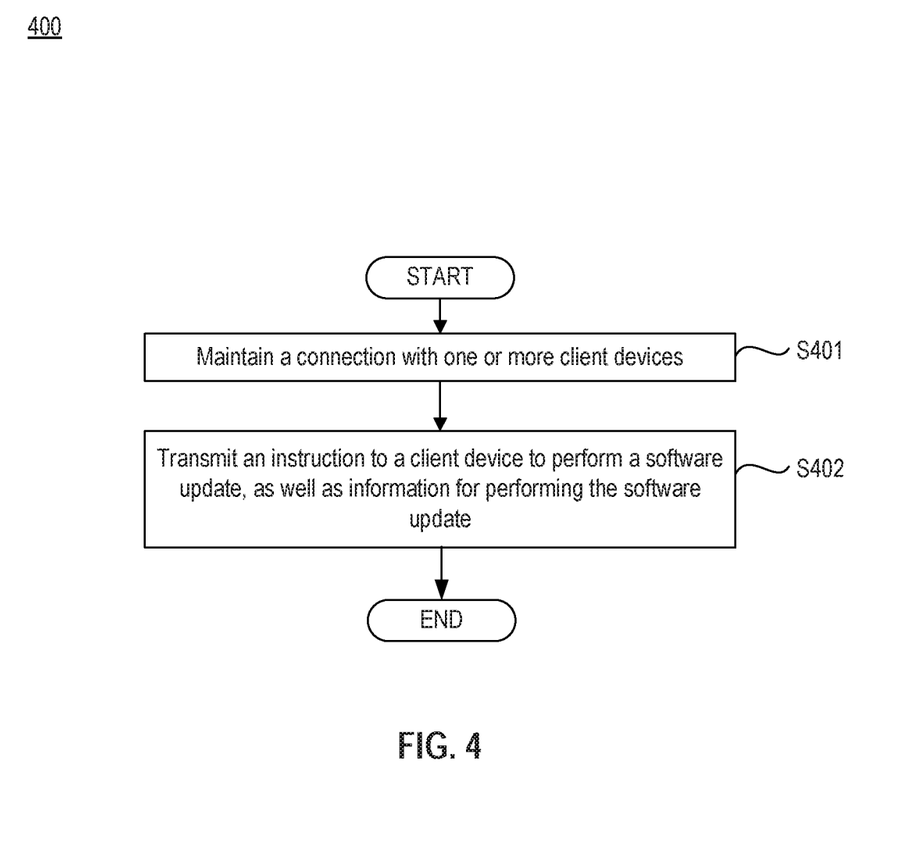
FIG. 4 is a flow chart illustrating an exemplary system for facilitating a software update process over a network, consistent with embodiments of the present disclosure.

Reference is now made to FIG. 4, which illustrates an exemplary method 400 for facilitating a software update process over a network, consistent with embodiments of the present disclosure. In some embodiments, method 400 can be performed by a network device (e.g., network device 2 of FIG. 1). Referring to FIG. 4, method 400 may include the following steps.

In step S401, the network device maintains a connection with one or more client devices. The maintenance of the connection may include, for example, exchange of heart beat messages between the network device and the one or more client devices.

In step S402, the network device transmits an instruction to a client device to perform a software update, as well as information for performing the software update. The network device may receive a request from the client device information about a current version of the software to be updated, and determine the requested information based on the current version information. The network device may also maintain software update information that correspond to different versions of the software, allows the network device to transmit the corresponding software update information to the requesting client device, to affect a predetermined version update of the software at the client device.

The present disclosure may be described in a general context of computer-executable commands or operations, such as a program module, stored on a computer readable medium and executed by a computing device or a computing system, including at least one of a microprocessor, a processor, a central processing unit (CPU), a graphical processing unit (GPU), etc. In general, the program module may include routines, procedures, objects, components, data structures, processors, memories, and the like for performing specific tasks or implementing a sequence of steps or operations.

The present disclosure may also be implemented in a distributed computing environment, and in these distributed computing environments, tasks or operations may be executed by a remote processing device connected through a communication network, e.g., the Internet. In the distributed computing environment, the program module may be located in a local or a remote non-transitory computer-readable storage medium, including a flash disk or other forms of flash memory, a Read-Only Memory (ROM), a Random Access Memory (RAM), a magnetic disk, an optical disk, a cache, a register, etc.

Furthermore, although aspects of the disclosed embodiments are described as being associated with data and/or instructions stored in a memory and/or other tangible and/or non-transitory computer-readable mediums, it would be appreciated that these data and/or instructions can also be stored on and executed from many types of tangible computer-readable storage medium, such as storage devices, including hard disks, floppy disks, or CD-ROM, or other forms of RAM or ROM. Accordingly, the disclosed embodiments are not limited to the above-described examples, but instead is defined by the appended claims in light of their full scope of equivalents.

Embodiments of the present disclosure may be embodied as a method, a system, a computer program product, etc. Accordingly, embodiments of the present disclosure may take the form of an entirely hardware embodiment, an entirely software embodiment, or an embodiment combining software and hardware for allowing a specialized device having the described specialized components to perform the functions described above. Furthermore, embodiments of the present disclosure may take the form of a computer program product embodied in one or more computer-readable storage media that may be used for storing computer-readable program codes.

Embodiments of the present disclosure are described with reference to flow charts and/or block diagrams of methods, devices (systems), and computer program products. It will be understood that each flow chart and/or block diagram can be implemented by computer program instructions. These computer program instructions may be provided to a processor of a special-purpose computer, an embedded processor, or other programmable data processing devices or systems to produce a machine or a platform, such that the instructions, when executed via the processor of the computer or other programmable data processing devices, implement the functions and/or steps specified in one or more flow charts and/or one or more block diagrams.

The computer-readable storage medium may refer to any type of non-transitory memory on which information or data readable by a processor may be stored. Thus, a computer-readable storage medium may store instructions for execution by one or more processors, including instructions for causing the processor(s) to perform steps or stages consistent with the embodiments described herein. The computer-readable medium includes non-volatile and volatile media, removable and non-removable media. The information and/or data storage can be implemented with any method or technology. Information and/or data may be modules of computer-readable instructions, data structures, and programs, or other types of data. Examples of a computer-readable storage medium include, but are not limited to, a phase-change random access memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a cache, a register, a compact disc read-only memory (CD-ROM), a digital versatile disc (DVD) or other optical storage, a cassette tape, tape or disk storage, or other magnetic storage devices, or any other non-transitory media that may be used to store information capable of being accessed by a computer device.

It should be noted that, the relational terms such as "first" and "second" are only used to distinguish an entity or operation from another entity or operation, and do necessarily require or imply that any such actual relationship or order exists among these entities or operations. It should be further noted that, as used in this specification and the appended claims, the singular forms "a," "an," and "the," and any singular use of any word, include plural referents unless expressly and unequivocally limited to one referent. As used herein, the terms "include," "comprise," and their grammatical variants are intended to be non-limiting, such that recitation of items in a list is not to the exclusion of other like items that can be substituted or added to the listed items.

Those skilled in the art may understand that the accompanying drawing is merely a schematic diagram of an exemplary implementation scenario, and the modules or processes in the accompanying drawing are not necessarily mandatory to the embodiments of the present invention.

Those skilled in the art may understand that the modules in the apparatus in the implementation scenario may be distributed in the apparatus of the implementation scenario according to the description of the implementation scenario, or may be changed correspondingly and located in one or more apparatuses in other different implementation scenarios. The modules in the foregoing implementation scenario may be combined into one module, or further divided into multiple sub-modules.

The sequence numbers of the foregoing embodiments of the present invention are merely for the convenience of description, and do not imply the preference among the implementation scenarios.

Disclosed above are merely several specific implementation scenarios of the embodiments of the present invention, but the embodiments of the present invention are not limited thereto. Any variation readily figured out by those skilled in the art shall fall within the protection scope of the present invention.

What is claimed is:

1. A client device for facilitating an update process of a software program, comprising:
    a memory that stores a set of instructions; and
    one or more processors configured to execute the set of instructions to cause the client device to:
        receive and process a user request for accessing a network device;
        maintain a connection with the network device;
        receive information for updating a software program installed on the client device from the network device;
        perform an updating of the software program installed on the client device based on the received information from the network device;
        when the updating of the software program installed on the client device is in progress, receive and store one or more user requests for accessing the network device; and
        after the updating of the software program installed on the client device is completed, continue to receive and store the one or more user requests for accessing the network device and process the stored one or more user requests for accessing the network device received when the updating of the software program installed on the client device is in progress and after the updating of the software program installed on the client device is completed.

2. The client device according to claim 1, wherein the one or more processors are further configured to execute the set of instructions to cause the client device to perform a format conversion of information transmitted between a logic processing module and the network device.

3. The client device according to claim 2, wherein the one or more processors are further configured to execute the set of instructions to cause the client device to:
    receive, from the network device, an instruction to perform the updating of the software program installed on the client device;
    after receiving the instruction, transmit a request for downloading information for updating the software program installed on the client device, wherein the request includes information about a current version of the software program installed on the client device; and
    download the requested information for updating the software program installed on the client device.

4. The client device according to claim 3, wherein the one or more processors are further configured to execute the set of instructions to cause the client device to:
    acquire, from the network device, verification information for verifying the requested information for updating the software program installed on the client device; and perform the updating of the software program installed on the client device based on the requested information for updating the software program installed on the client device after verifying the requested information for updating the software program installed on the client device.

5. The client device according to claim 4, wherein the one or more processors are further configured to execute the set of instructions to cause the client device to:
   transmit, periodically to the network device within a predetermined interval, one or more heart beat request packets;
   monitor for a heart beat response packet received from the network device after transmitting the one or more heart beat request packets; and
   determine whether the connection with the network device is maintained based on whether the heart beat response packet is received from the network device.

6. The client device according to claim 5, wherein the set of instructions are implemented using a dynamic programming language.

7. The client device according to claim 6, wherein the one or more processors are further configured to execute the set of instructions to cause the client device to:
   activate one or more computation resources for performing the updating of the software program installed on the client device.

8. A computer-implemented method for facilitating an update process of a software program, comprising:
   receiving and processing a user request for accessing a network device;
   maintaining a connection with the network device;
   receiving information for updating a software program installed on the client device from the network device;
   performing an updating of the software program installed on the client device based on the received information from the network device;
   when the updating of the software program installed on the client device is in progress, receiving and storing one or more user requests for accessing the network device; and
   after the updating of the software program installed on the client device is completed, continue receiving and storing the one or more user requests for accessing the network device and processing the stored one or more user requests for accessing the network device received when the updating of the software program installed on the client device is in progress and after the updating of the software program installed on the client device is completed.

9. The computer-implemented method according to claim 8, further comprising:
   performing a format conversion of information received from the network device.

10. The computer-implemented method according to claim 9, wherein performing an updating of the software program installed on the client device based on the received information from the network device comprises:
    receiving, from the network device, an instruction to perform the updating of the software program installed on the client device;
    after receiving the instruction, transmitting a request for downloading information for updating the software program installed on the client device, wherein the request includes information about a current version of the software program installed on the client device; and
    downloading the requested information for updating the software program installed on the client device.

11. The computer-implemented method according to claim 10, wherein performing an updating of the software program installed on the client device based on the received information from the network device comprises:
    acquiring, from the network device, verification information for verifying the requested information for updating the software program installed on the client device; and
    performing the updating of the software program installed on the client device based on the requested information for updating the software program installed on the client device after verifying the requested information for updating the software program installed on the client device.

12. The computer-implemented method according to claim 11, wherein maintaining a connection with the network device comprises:
    transmitting, periodically to the network device within a predetermined interval, one or more heart beat request packets;
    monitoring for a heart beat response packet received from the network device after transmitting the one or more heart beat request packets; and
    determining whether the connection with the network device is maintained based on whether the heart beat response packet is received from the network device.

13. The computer-implemented method according to claim 12, wherein the stored one or more user requests are processed using a dynamic programming language.

14. The computer-implemented method according to claim 13, wherein performing an updating of the software program installed on the client device based on the received information from the network device comprises:
    activating one or more computation resources for performing the updating of the software program installed on the client device.

15. A non-transitory computer-readable medium that stores a set of instructions that is executable by at least one processor of a client device to cause the client device to perform a method for facilitating an update process of a software program, the method comprising:
    receiving and processing a user request for accessing a network device;
    maintaining a connection with the network device;
    receiving information for updating a software program installed on the client device from the network device;
    performing an updating of the software program installed on the client device based on the received information from the network device;
    when the updating of the software program installed on the client device is in progress, receiving and storing one or more user requests for accessing the network device; and
    after the updating of the software program installed on the client device is completed, continue receiving and storing the one or more user requests for accessing the network device and processing the stored one or more user requests for accessing the network device received when the updating of the software program installed on the client device is in progress and after the updating of the software program installed on the client device is completed.

* * * * *